US008644318B2

(12) United States Patent
Venkatraman et al.

(10) Patent No.: US 8,644,318 B2
(45) Date of Patent: Feb. 4, 2014

(54) SYSTEMS AND METHODS FOR ASYNCHRONOUS HANDSHAKE-BASED INTERCONNECTS

(75) Inventors: Subramaniam Venkatraman, Santa Clara, CA (US); Jeffrey Alexander Levin, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 174 days.

(21) Appl. No.: 13/238,069

(22) Filed: Sep. 21, 2011

(65) Prior Publication Data

US 2013/0070768 A1  Mar. 21, 2013

(51) Int. Cl.
*H04L 12/28* (2006.01)
(52) U.S. Cl.
USPC ........ 370/392; 370/236; 370/359; 370/395.1; 370/476; 370/544; 709/224; 709/236; 709/250; 714/749

(58) Field of Classification Search
USPC .............. 370/236, 359, 366, 389, 392, 395.1, 370/474–476, 496, 522, 524, 536, 544; 709/236, 237, 250; 714/748–749; 326/54–55
See application file for complete search history.

(56) References Cited

U.S. PATENT DOCUMENTS

| 4,597,082 | A  | * | 6/1986  | Hill et al. ...................... 714/748 |
| 6,021,128 | A  | * | 2/2000  | Hosoya et al. ................ 370/380 |
| 6,847,614 | B2 | * | 1/2005  | Banker et al. ................ 370/252 |
| 6,958,627 | B2 | * | 10/2005 | Singh et al. ..................... 326/93 |
| 2002/0044553 | A1 | * | 4/2002  | Chakravorty ................ 370/392 |
| 2008/0107160 | A1 |   | 5/2008  | Karaki |
| 2008/0177994 | A1 | * | 7/2008  | Mayer ............................... 713/2 |
| 2010/0309961 | A1 |   | 12/2010 | Elrabaa et al. |
| 2011/0121857 | A1 | * | 5/2011  | Nowick et al. ................ 326/54 |

FOREIGN PATENT DOCUMENTS

WO    WO2006089559 A1    8/2006

OTHER PUBLICATIONS

Alhussien et al., "A scalable delay insensitive asynchronous NoC with adaptive routing," (ICT), 2010 IEEE 17th Int'l Conf. Apr. 2010, pp. 995-1002.
Bainbridge et al., "Asynchronous System-on-Chip Interconnect," Thesis to Univ. of Manchester, Mar. 2000, pp. 1-183.
Bainbridge at al., "Chain: A delay-insensitive chip area interconnect," IEEE Micro, Sep. 2002, pp. 16-23.
Bainbridge et al., "Delay Insensitive System-on-Chip Interconnect using 1-of-4 Data Encoding," IEEE, 2001, pp. 118-126.
Bjerregaard et al., "Implementation of guaranteed services in the MANGO ciockless network-on-chip," Computers and Digital Techniques, vol. 153, No. 4. IEE Proceedings Jul. 2006, pp. 217-229.
Lu, S.L., "Improved design of CMOS multiple-input Muller-C-elements," Electronics Letters, vol. 29, 1993, pp. 1680-1682.
Sutherland, Ivan E., "Micropipelines," Communications of the ACM, vol. 32 No. 6, Jun. 1989, pp. 720-738.

(Continued)

*Primary Examiner* — Jeffrey M Rutkowski
*Assistant Examiner* — Rasha Fayed
(74) *Attorney, Agent, or Firm* — Rupit M. Patel

(57) ABSTRACT

Certain aspects of the present disclosure provides techniques for a handshaking protocol, and corresponding circuit elements, for an asynchronous network. The techniques utilize a clock-less delay insensitive data encoding scheme. The proposed network may operate correctly regardless of the delay in the interconnecting wires.

21 Claims, 8 Drawing Sheets

(56) References Cited

OTHER PUBLICATIONS

Taylor, et al, "An on-chip dynamically recalibrated delay line for embedded self-timed systems," Advanced Research in Asynchronous Circuits and Systems, 2000. (ASYNC 2000) Proceedings. Sixth International Symposium on, 2000, pp. 45-51.

Xu et al., "Asynchronous Packet-Switching for Networks-on-Chip," Proceedings of the Sixth International Conference on Application of Concurrency to System Design, Jun. 2006, IEEE, 7 pages.

International Search Report and Written Opinion—PCT/US2012/056714—ISA/EPO—Mar. 26, 2013.

Singh M et al., "MOUSETRAP: ultra-high-speed transition-signaling asynchronous pipelines", Proceedings 2001 International Conference on Computer Design. (ICCD). Austin, TX, Sep. 23-26, 2001; [International Conference on Computer Design], Los Alamitos, CA: IEEE Comp. Soc, US, Sep. 23, 2001, pp. 9-17, XP010560958, DOI: 10.1109/1 CCD.2001.954997 ISBN: 978-0-7695-1200-6.

Storto M et al., "Time-multiplexed dual-rail protocol for low power delay-insensitive asynchronous communication", PATMOS International Workshop on Power Timing Modeling Optimization and Simulation, XP002475259, vol. 137, Oct. 7, 1998, pp. 136-145.

* cited by examiner

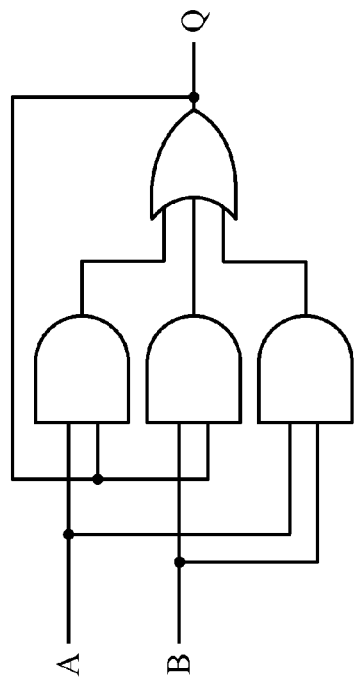
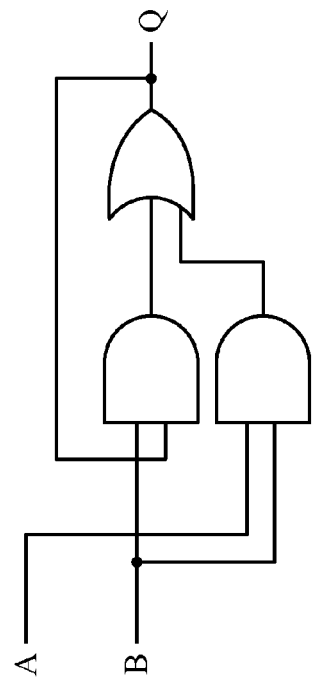
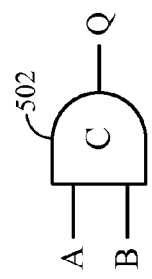
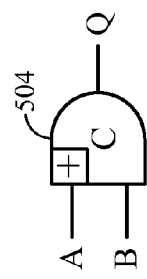
FIG. 5

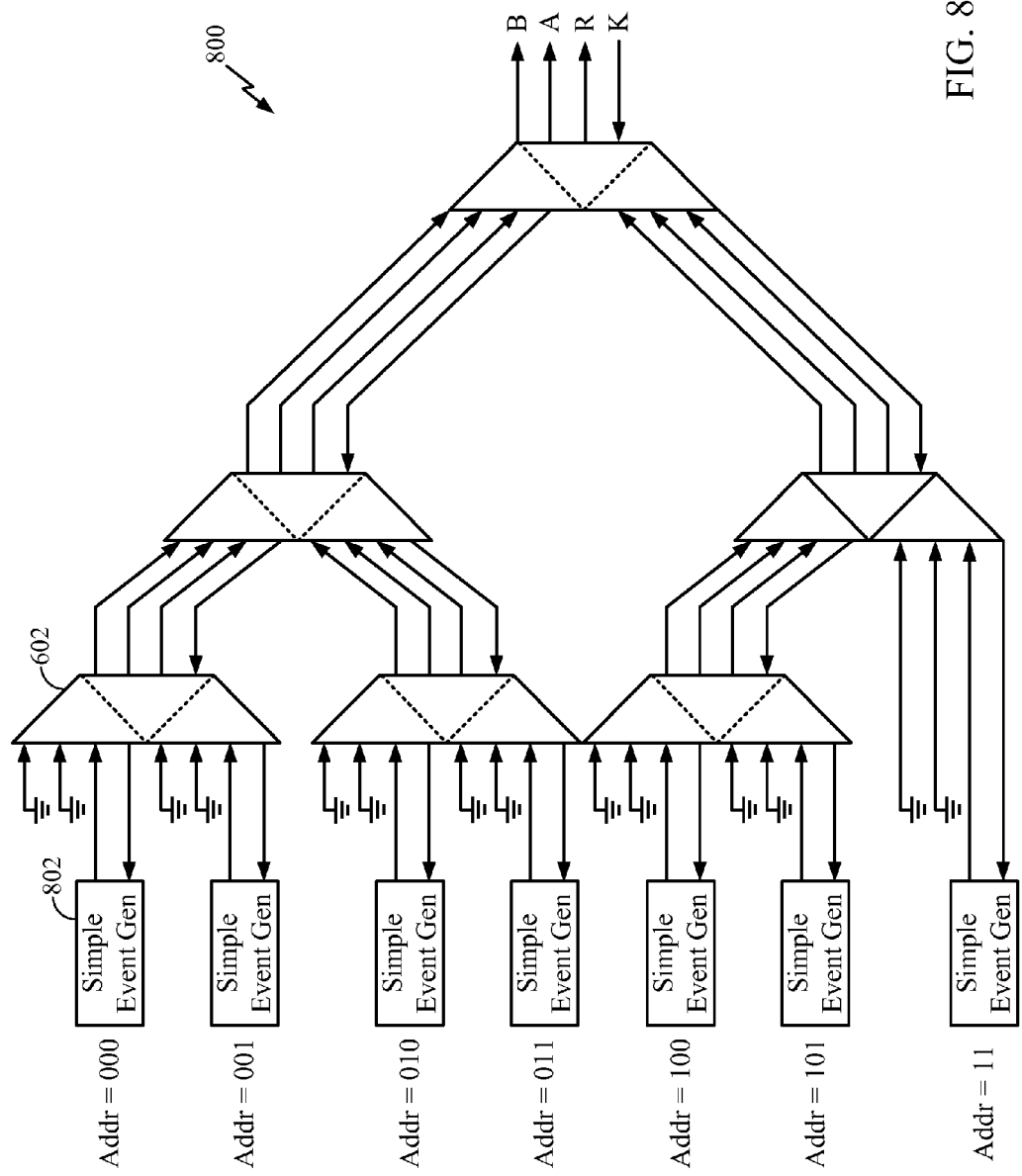

SYSTEMS AND METHODS FOR ASYNCHRONOUS HANDSHAKE-BASED INTERCONNECTS

BACKGROUND

1. Field

Certain embodiments of the present disclosure generally relate to asynchronous interconnects and, more particularly, to designing circuit blocks and handshaking protocol for an asynchronous network.

2. Background

Large-scale system on chip applications that use a global synchronous interconnect with a high-frequency clock may suffer from serious clock skew issues. Incorporating multiple clock domains in such synchronous systems may be difficult. An asynchronous network bus may be preferred for such high performance or large-scale applications.

SUMMARY

Certain embodiments of the present disclosure provide an asynchronous node in a network. The asynchronous node generally includes at least one set of wires comprising a first wire for indicating start and end of a packet utilizing two-phase signaling, a second and a third wire for sending the packet utilizing return to zero, dual-rail encoding, wherein signals conveyed by the first, second and third wires comprise a data stream and a fourth wire for receiving an acknowledgement signal that acknowledges receipt of every transition in the data stream.

Certain embodiments of the present disclosure provide an asynchronous network. The asynchronous network generally includes a plurality of wires and a plurality of network nodes that communicate asynchronously via the wires. Each network node generally includes a plurality of wires at least one set of input wires comprising a first input wire for indicating start and end of an input packet utilizing two-phase signaling, a second and a third input wires for receiving the input packet, wherein signals conveyed by the first, second and third input wires comprise an input data stream, an outgoing acknowledgement wire for transmitting a first acknowledgement signal that acknowledges receipt of each transition in the input data stream, and at least one set of output wires comprising a first output wire for indicating start and end of an output packet utilizing two-phase signaling, a second and a third output wires for transmitting the output packet utilizing return to zero, dual-rail encoding, wherein signals conveyed by the first, second and third output wires comprise an output data stream, and an incoming acknowledgement wire for receiving a second acknowledgement signal that acknowledges receipt of each transition in the output data stream.

Certain embodiments of the present disclosure provide a method for communicating in an asynchronous node in a network. The method generally includes receiving an indication of start and end of an input packet on a first input wire, receiving the input packet on a second and a third input wire, wherein the packet is generated utilizing return to zero, dual-rail encoding, wherein signals conveyed by the first, second and third input wires comprise an input data stream, and transmitting a first acknowledgement signal that acknowledges receipt of each transition in the input data stream on an outgoing acknowledgement wire.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 5 illustrates a Muller C element and an asymmetric Muller C element that may be used in an asynchronous network.

FIG. 8 illustrates an example of an asynchronous network tree, in accordance with certain aspects of the present disclosure.

DETAILED DESCRIPTION

Figure 1:
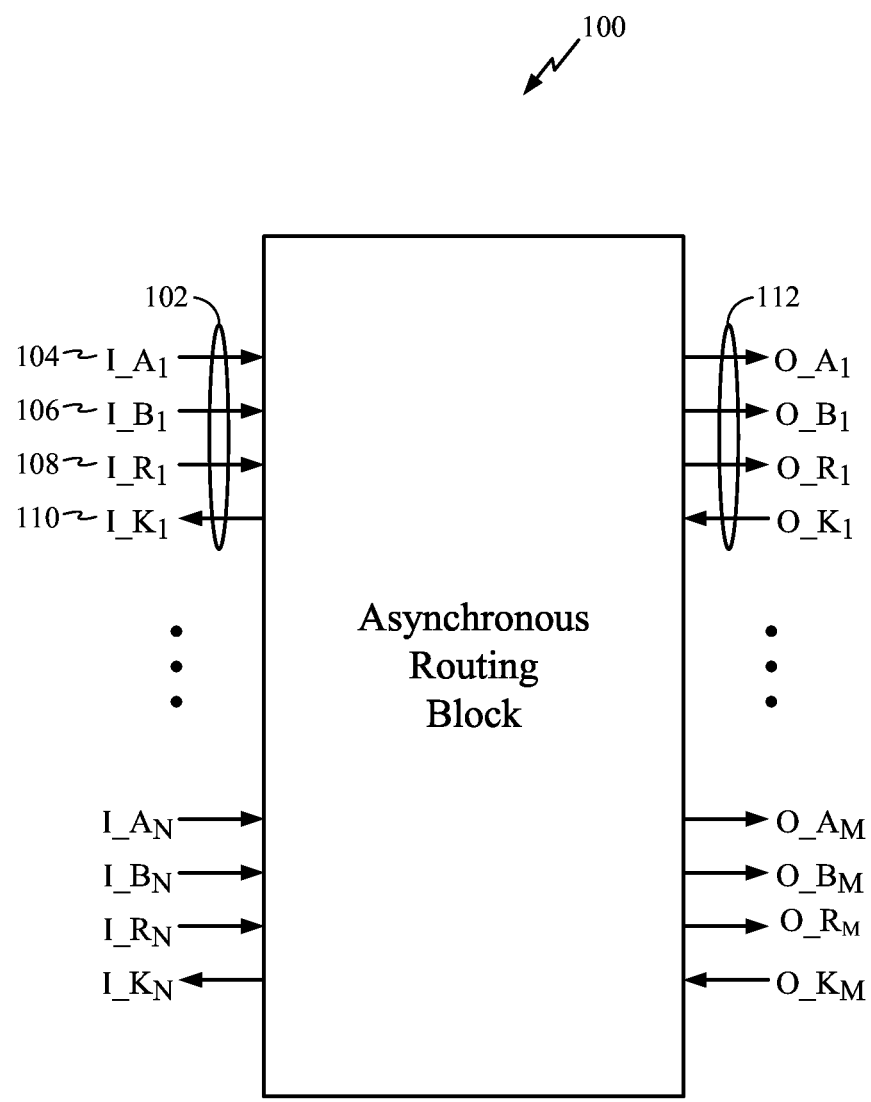
FIG. 1 illustrates an example asynchronous routing block that may be used in an asynchronous network, in accordance with certain aspects of the present disclosure.

Various embodiments of the disclosure are described more fully hereinafter with reference to the accompanying drawings. This disclosure may, however, be embodied in many different forms and should not be construed as limited to any specific structure or function presented throughout this disclosure. Rather, these embodiments are provided so that this disclosure will be thorough and complete, and will fully convey the scope of the disclosure to those skilled in the art. Based on the teachings herein one skilled in the art should appreciate that the scope of the disclosure is intended to cover any embodiment of the disclosure disclosed herein, whether implemented independently of or combined with any other embodiment of the disclosure. For example, an apparatus may be implemented or a method may be practiced using any number of the embodiments set forth herein. In addition, the scope of the disclosure is intended to cover such an apparatus or method which is practiced using other structure, functionality, or structure and functionality in addition to or other than the various embodiments of the disclosure set forth herein. It should be understood that any embodiment of the disclosure disclosed herein may be embodied by one or more elements of a claim.

The word "exemplary" is used herein to mean "serving as an example, instance, or illustration." Any embodiment described herein as "exemplary" is not necessarily to be construed as preferred or advantageous over other embodiments.

Although particular embodiments are described herein, many variations and permutations of these embodiments fall within the scope of the disclosure. Although some benefits and advantages of the preferred embodiments are mentioned, the scope of the disclosure is not intended to be limited to particular benefits, uses or objectives. Rather, embodiments of the disclosure are intended to be broadly applicable to different technologies, system configurations, networks and protocols, some of which are illustrated by way of example in the figures and in the following description of the preferred embodiments. The detailed description and drawings are merely illustrative of the disclosure rather than limiting, the scope of the disclosure being defined by the appended claims and equivalents thereof.

An Example Asynchronous Network

Certain aspects of the present disclosure provide techniques and corresponding apparatus (e.g., circuit blocks) for a handshaking protocol that may be used in an asynchronous network. The proposed asynchronous network utilizes a clock-less delay-insensitive data encoding scheme. The proposed handshaking protocol may allow for an asynchronous network designed to operate correctly regardless of delay in the interconnecting wires.

An asynchronous network on a chip, such as that described herein, may be used for routing events and serial packets between different blocks. For example, the asynchronous network may be used in large-scale hardware simulations of neural networks where each neuron can spike at random instants and needs to send a packet of information to a large number of neurons distributed across the network. Other applications of such an asynchronous network may include large 'system on chip' applications where a global synchronous interconnect with a high-frequency clock suffers from serious clock skew issues.

FIG. 1 illustrates an example asynchronous routing block 100 that may be used in an asynchronous network, in accordance with certain aspects of the present disclosure. As illustrated, the asynchronous routing block may have N sets of input wires and M sets of output wires, in which N and M are integers.

Each set of input wires 102 may include three input wires (e.g., I_R, I_A, I_B) and one corresponding outgoing acknowledgement (e.g., K) wire. The R wire (e.g., I_R$_1$ 108) may show duration of a packet by transitioning to a state (e.g., high or low) at the start of the packet and staying in the same state (e.g., high or low) for the duration of the packet. The A and B wires (e.g., I_A$_1$ 104, I_B$_1$ 106) may serially receive the packet as ones and zeros. The acknowledgement wire (e.g., I_K$_1$ 110) may acknowledge receipt of each transition in any of the R, A or B wires from a previous stage.

Each set of output wires 112 may include three outgoing wires (e.g., O_R, O_A, O_B) and one corresponding incoming acknowledgement (e.g., K) wire. Similarly, the R wire may show duration of an outgoing packet by transitioning to a state at the start of the packet and staying in the same state for the duration of the packet. The A and B wires may serially send the packet as ones and zeros utilizing an encoding scheme, such as the return to zero, dual rail encoding. The incoming acknowledgement wire (e.g., O_K) may acknowledge receipt of each transition in any of the R, A or B wires by a next element in the network.

The asynchronous routing block 100 may be a pipeline latch, a consolidator, a distributor or any other block used in an asynchronous network. The pipeline latch may serve as an asynchronous latch, the consolidator may combine two input streams, and the distributor may route incoming packets to two different destinations.

Figure 2:
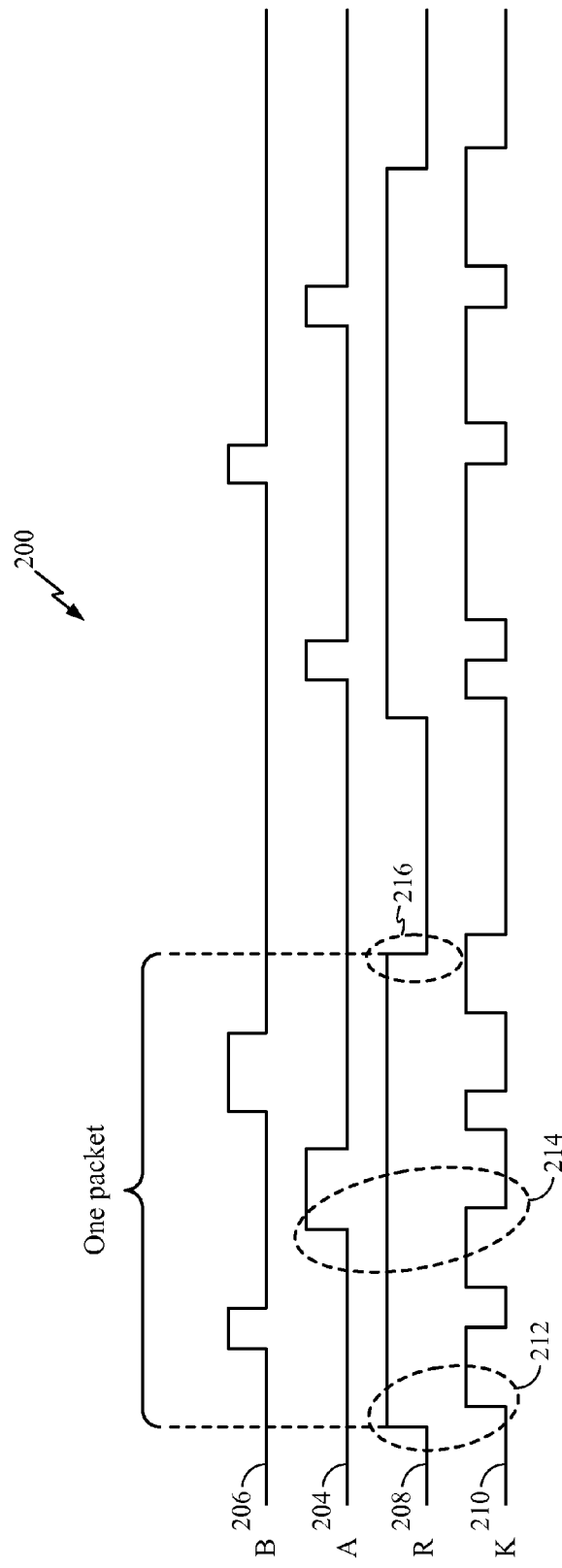
FIG. 2 illustrates signaling protocol for handshaking between different blocks in an asynchronous network, in accordance with certain aspects of the present disclosure.

FIG. 2 illustrates signaling protocol for handshaking between different blocks in an asynchronous network. As described earlier, the A 204 and B 206 signals may send data using return to zero, dual-rail encoding. At the beginning of a packet, the R 208 signal may transition to high (e.g., event 212) and may remain high for the duration of the packet (e.g., until event 216). The A and B signals may send the packet. The K 210 signal may acknowledge each transition on any of the R, A or B wires (e.g., events 212 and 214). It should be noted that the R signal may use two-phase signaling protocol, which may lead to simpler hardware blocks in the asynchronous network compared to conventional asynchronous networks.

An asynchronous communication network may require pipeline stages to improve the bandwidth of links and minimize congestion. The pipeline stages may have minimal impact on the latency of the network since the time taken to acknowledge a transition may be equal to the sum of the delay of a few (e.g., four) logic gates.

Figure 3:
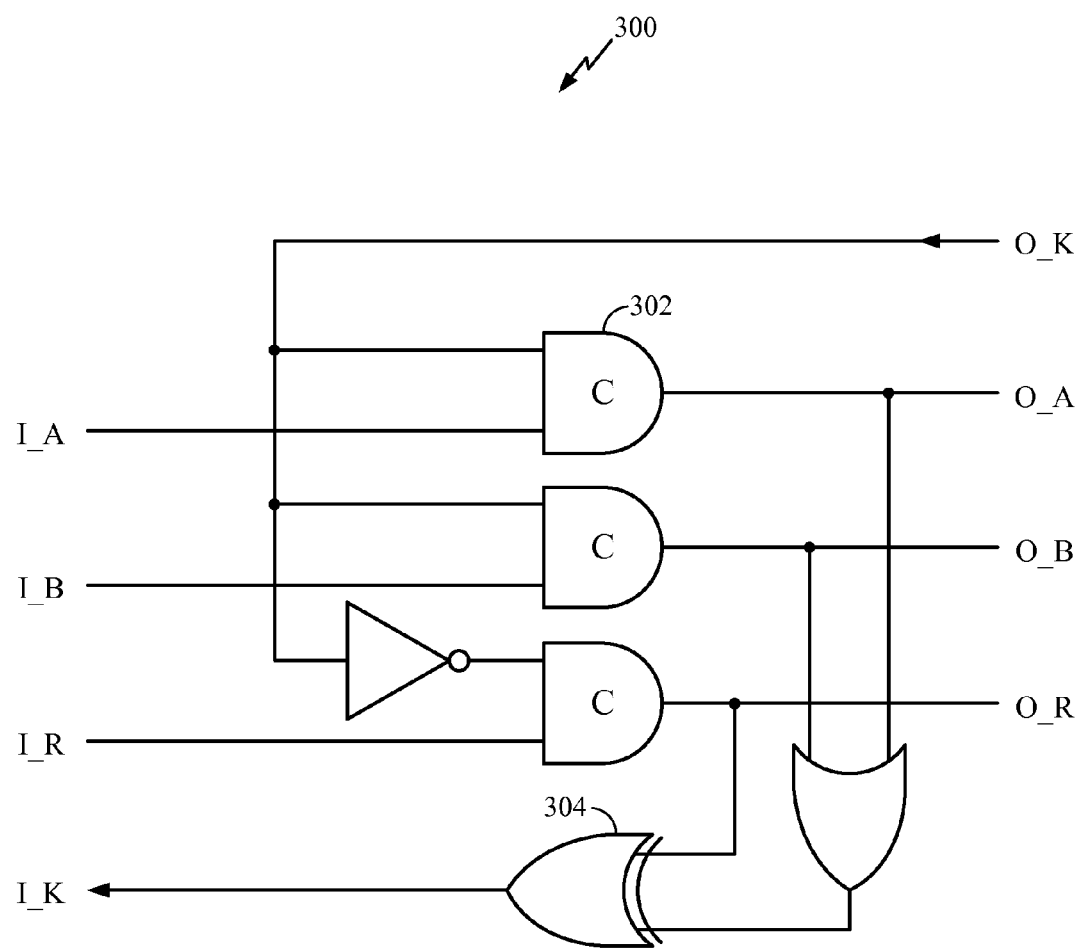
FIG. 3 illustrates an asynchronous pipeline latch, in accordance with certain aspects of the present disclosure.

FIG. 3 illustrates an asynchronous pipeline latch 300, in accordance with certain aspects of the present disclosure. As illustrated, the asynchronous pipeline latch may input a data stream (e.g., I_A, I_B and I_R signals) and output their corresponding acknowledgement signal (e.g., I_K). The asynchronous latch may also output a data stream (e.g., O_A, O_B, O_R) and input their corresponding acknowledgement (e.g., O_K).

The asynchronous latch may include three Muller C elements 302 (shown in greater detail in FIG. 5). The asynchronous latch may also generate handshaking signals required between elements assuming that the A, B and R signals follow the protocol described in FIG. 2. For example, the asynchronous latch may generate an acknowledgement signal using an XOR gate 304 to acknowledge correct reception of a data stream from a previous element. The acknowledgement signal may be generated by taking advantage of the fact that the R signal uses a two-phase signaling protocol.

Figure 4:
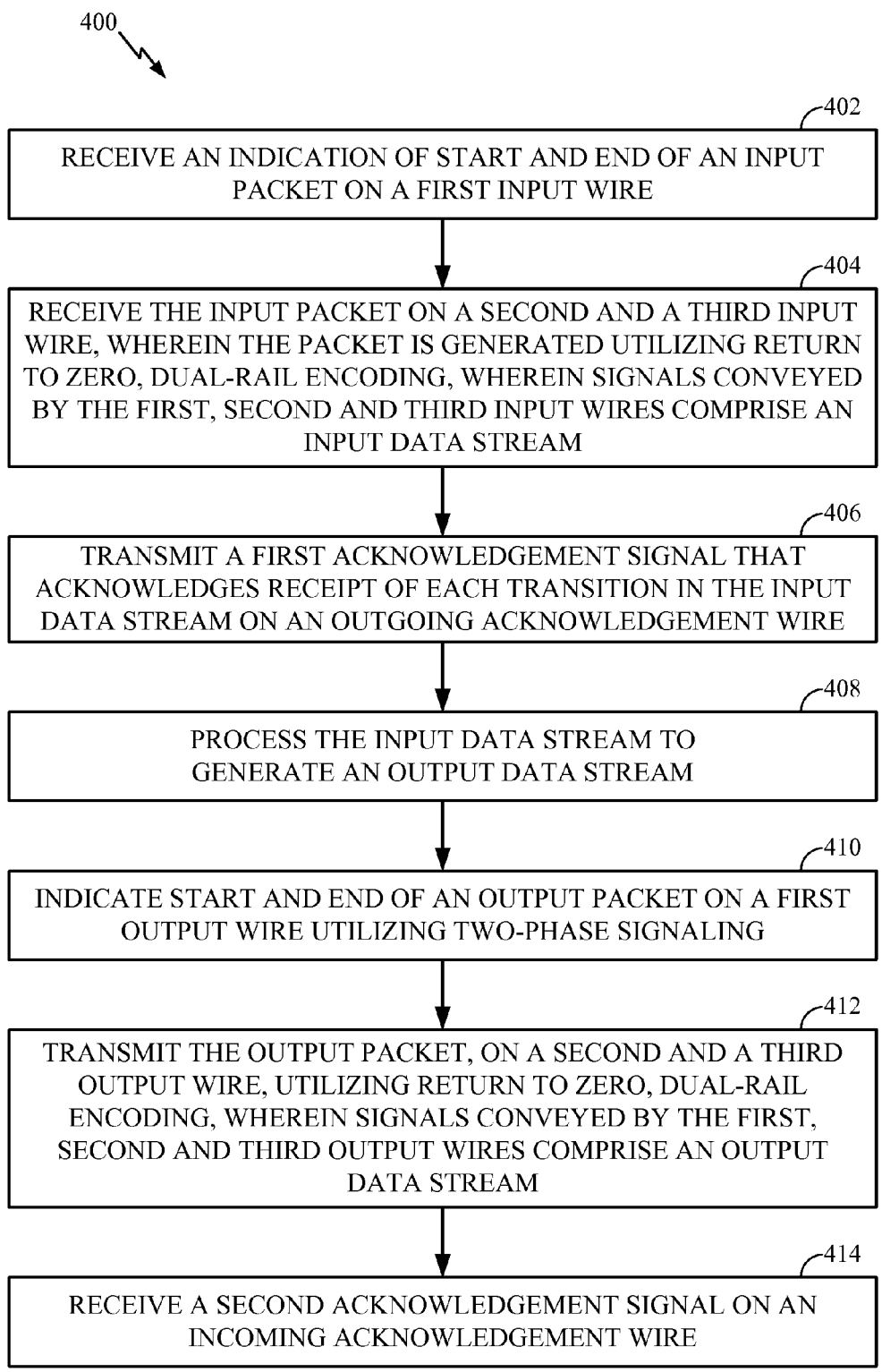
FIG. 4 illustrates example operations that may be performed by an asynchronous node in an asynchronous network, in accordance with certain aspects of the present disclosure.

FIG. 4 illustrates example operations that may be performed by an asynchronous node in an asynchronous network, in accordance with certain aspects of the present disclosure.

At 402, an asynchronous node may receive an indication of start and end of an input packet on a first input wire. At 404, the asynchronous node may receive the input packet on a second and a third input wire. The packet may be generated utilizing return to zero, dual-rail encoding. The signals conveyed by the first, second and third input wires comprise an input data stream. At 406, the asynchronous node may transmit a first acknowledgement signal that acknowledges receipt of each transition in the input data stream on an outgoing acknowledgement wire.

At 408, the asynchronous node may process the input data stream to generate an output data stream. At 410, the asynchronous node may indicate start and end of an output packet on a first output wire utilizing two-phase signaling. At 412, the asynchronous node may transmit the output packet, on a second and a third output wire, utilizing return to zero, dual-rail encoding. The signals conveyed by the first, second and third output wires comprise an output data stream. At 414, the asynchronous node may receive a second acknowledgement signal on an incoming acknowledgement wire.

FIG. 5 illustrates a Muller C element 502 and an asymmetric Muller C element 504 that may be used in the proposed asynchronous network. Output of the Muller C element is asserted when both inputs are high; and de-asserted when both inputs are low. With differing inputs, the output retains its previous value as illustrated in table 506. Multiple-input Muller C elements use similar principle as two-input Muller C elements.

Asymmetric Muller C elements 504 may ignore particular inputs for certain transitions. For example, the asymmetric Muller C element 504 ignores the transition from one to zero on input A.

Figure 6A:
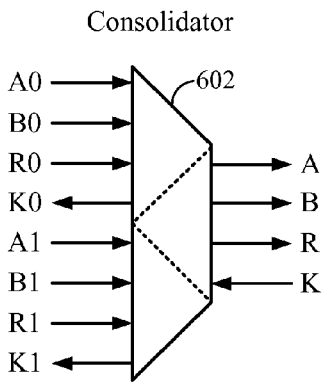
FIGS. 6A-6B illustrate an asynchronous consolidator, in accordance with certain aspects of the present disclosure.
Figure 6B:
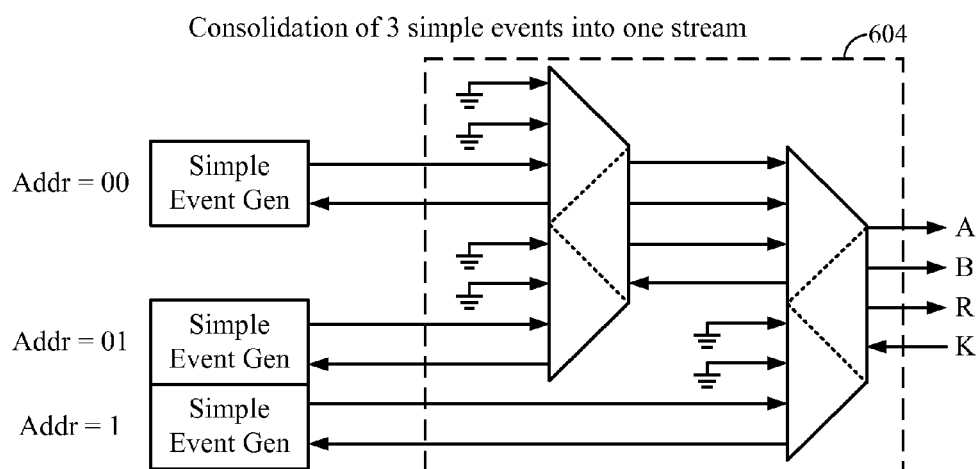

FIGS. 6A-6B illustrate a consolidator that may be used in an asynchronous network, in accordance with certain aspects of the present disclosure. FIG. 6A illustrates a two-input consolidator 602 that receives serial data from two inputs and outputs the packet that arrived first while holding back the second packet.

The consolidator 602 may add one address bit to the header of the packet. The address bit may define which of the two inputs of the consolidator generated the packet. Since mutual exclusivity of activity on the two inputs cannot be guaranteed, an arbiter may be used to decide which of the two packets (and hence the R signals) arrived first. The second packet is transmitted only after the first packet is completed as signaled by the R signal returning to its previous state (e.g., zero). The use of two-phase encoding on the R signal simplifies the circuitry used for creation of the address and handshaking with the next stage. Addition of the address bit at each consolidator automatically encodes the address of the sender of the packet in the packet header.

For certain aspects, a network of consolidators may receive packets from different event or packet generators and route them through the network while automatically adding address bits to the header. The address of the packet generator may automatically be encoded in the header by its position in the network and by the act of passing through the network. It should be noted that the address of the packet generator may not need to be stored in the individual packet generator.

According to certain aspects, one or more pipeline latches may be added before each consolidator to minimize congestion in the network and to ensure that previous stages are not blocked by bits which are awaiting acknowledgements from downstream stages.

FIG. 6B illustrates an example 3-input consolidator 604 utilizing two-input consolidators 602. Similar principles may be used to generate n-input consolidators, in which n may be an integer larger than two.

Figure 7:
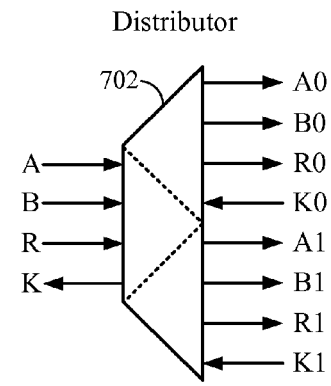
FIG. 7 illustrates an asynchronous distributor, in accordance with certain aspects of the present disclosure.

FIG. 7 illustrates a distributor that may be used in an asynchronous network, in accordance with certain aspects of the present disclosure. The distributor 702 may send a received input packet to one of its two outputs based on the address bits in the header of the packet. The distributor 702 may route incoming packets to one of two outputs based on the first bit in the packet header. The distributor may also remove the first bit in the header (e.g., the address bit) which was used to decide destination of the packet. As a result, packets can be routed through a network of distributors, which only observe and delete the first bit of the header while passing along the remaining of the packet.

As described earlier, the consolidator 602 and the distributor 702 may represent two useful blocks for routing information in the proposed asynchronous network. FIG. 8 illustrates an example of a network tree that can be designed with consolidators, in accordance with certain aspects of the present disclosure. The network tree 800 may convey events generated by the simple event generators on the leaf nodes to the root node while ensuring that the appropriate address bits are added to the serial packets. For certain aspects, an analogous tree of distributors may also be designed to transmit information from the root node to various leaf nodes. As illustrated, six two-input consolidators may be used to generate a 7-input network tree. The simple event generators 802 generate events on the leaves of the tree and the consolidators route the events to the root of the tree.

Figure 9:
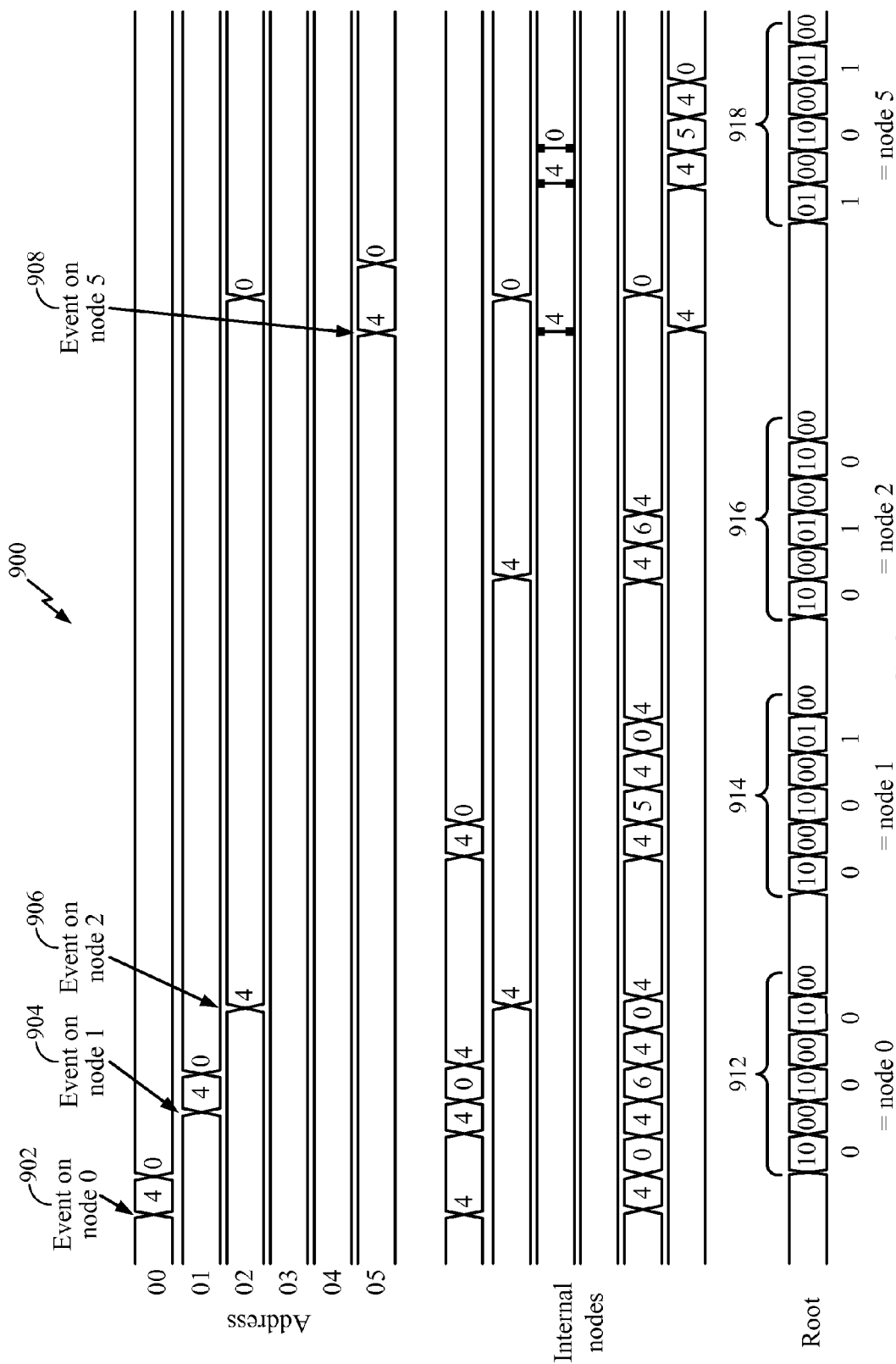
FIG. 9 illustrates an example simulation of the network tree presented in FIG. 8, in accordance with certain aspects of the present disclosure.

FIG. 9 illustrates an example simulation of the network tree 800 presented in FIG. 8, in accordance with certain aspects of the present disclosure. The network tree of consolidators 800 is designed in VHDL and simulated using Modelsim software. The circuit blocks used for the simulation are designed as shown in FIGS. 5 and 6A. Events 902, 904, 906 and 908 are generated at nodes 0, 1, 2, and 5, respectively. Serial packets 912, 914, 916 and 918 are received at the root node to signal each of the events 902, 904, 906 and 908, respectively. These serial packets encode the address of the node creating the event. The data is dual-rail encoded and the final serial data at the root node is interpreted in the legend below. Pipeline latches are added between the consolidators to minimize congestion in the network.

The asynchronous handshake-based network proposed in the current disclosure passes events and serial packets across a network. The signaling protocol and circuit blocks used may be described and implemented in VHDL. The proposed asynchronous network enables rapid communication across large hardware designs without the need for high-speed clocks. The proposed asynchronous network possess a number of advantages over conventional synchronous networks, such as simplifying timing analysis, reducing power consumption in the clock tree and reducing electromagnetic emissions.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. In addition, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain embodiments may comprise a computer program product for performing the operations presented herein. For example, such a computer program product may comprise a computer readable medium having instructions stored (and/or encoded) thereon, the instructions being executable by one or more processors to perform the operations described herein. For certain embodiments, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. An asynchronous node in a network comprising:
   at least one set of input wires comprising a first input wire for indicating start and end of an input packet utilizing two-phase signaling, a second and a third input wires for receiving the input packet, wherein signals conveyed by the first, second and third input wires comprise an input data stream;
   an outgoing acknowledgement wire for transmitting a first acknowledgement signal that acknowledges receipt of each transition in the input data stream; and
   at least one set of output wires comprising a first output wire for indicating start and end of an output packet utilizing two-phase signaling, a second and a third output wires for transmitting the output packet utilizing return to zero, dual-rail encoding, wherein signals conveyed by the first, second and third output wires comprise an output data stream, and an incoming acknowledgement wire for receiving a second acknowledgement signal that acknowledges receipt of each transition in the output data stream.

2. The asynchronous node of claim 1, wherein the first input wire transitions to indicate start of the input packet and stays high for a duration of the input packet.

3. The asynchronous node of claim 1, wherein the asynchronous node is an asynchronous pipeline latch comprising an XOR gate for generating the first acknowledgement signal.

4. The asynchronous node of claim 1, wherein the asynchronous node comprises a consolidator comprising:
   a circuit for combining a first data stream received on a first set of input wires with a second data stream received on a second set of input wires to generate the output data stream; and
   a circuit for transmitting the output data stream on the set of output wires.

5. The asynchronous node of claim 4, wherein the circuit for combining comprises:
   a circuit for receiving a first packet on the first set of input wires and a second packet on the second set of input wires;
   an arbiter for determining which of the first or the second packets arrived first;
   a circuit for adding at least one bit to headers of the first and the second packets to indicate address;
   a circuit for outputting the first packet followed by the second packet, if the first packet arrived first; and
   a circuit for outputting the second packet followed by the first packet, if the second packet arrived first.

6. The asynchronous node of claim 1, wherein the asynchronous node comprises a distributor comprising a circuit for routing two or more packets that are received in the input data stream to two sets of output wires based on addresses of the packets.

7. The asynchronous node of claim 6, further comprising:
   a circuit for removing one or more address bits from the packets before routing the packets.

8. The asynchronous node of claim 1, wherein the asynchronous node comprises a plurality of Muller C elements.

9. The asynchronous node of claim 4, wherein the network comprises a plurality of consolidators, each of the consolidators receives a plurality of input packets from a plurality of packet generators and routes the input packets through the network by automatically adding address bits to the headers of the input packets.

10. The asynchronous node of claim 9, wherein address of a packet generator is automatically encoded in a header of its generated packet while passing through the plurality of consolidators, based on position of the packet generator in the network.

11. A method for communicating in an asynchronous node in a network comprising:
receiving an indication of start and end of an input packet on a first input wire;
receiving the input packet on a second and a third input wire, wherein the packet is generated utilizing return to zero, dual-rail encoding, wherein signals conveyed by the first, second and third input wires comprise an input data stream; and
transmitting a first acknowledgement signal that acknowledges receipt of each transition in the input data stream on an outgoing acknowledgement wire.

12. The method of claim 11, further comprising:
processing the input data stream to generate an output data stream.

13. The method of claim 11, further comprising:
indicating start and end of an output packet on a first output wire utilizing two phase signaling.

14. The method of claim 13, further comprising:
transmitting the output packet, on a second and a third output wire, utilizing return to zero, dual-rail encoding, wherein signals conveyed by the first, second and third output wires comprise an output data stream.

15. The method of claim 14, further comprising receiving a second acknowledgement signal on an incoming acknowledgement wire.

16. The method of claim 11, wherein the first input wire transitions to indicate start of the input packet and stays high for a duration of the input packet.

17. The method of claim 11, further comprising generating the first acknowledgement signal via an XOR gate.

18. The method of claim 11, further comprising:
receiving a first packet on the first set of input wires and a second packet on the second set of input wires;
determining which of the first or the second packets arrived first;
adding at least one bit to headers of the first and the second packets to indicate address; and
outputting the first packet followed by the second packet, if the first packet arrived first or outputting the second packet followed by the first packet, if the second packet arrived first.

19. The method claim 11, further comprising routing two or more packets that are received in the input data stream to two sets of output wires based on addresses of the packets.

20. The method of claim 19, further comprising:
removing one or more address bits from the packets before routing the packets.

21. A network comprising:
a plurality of wires; and
a plurality of network nodes that communicate asynchronously via the wires, each network node comprising,
a plurality of wires at least one set of input wires comprising a first input wire for indicating start and end of an input packet utilizing two-phase signaling, a second and a third input wires for receiving the input packet, wherein signals conveyed by the first, second and third input wires comprise an input data stream;
an outgoing acknowledgement wire for transmitting a first acknowledgement signal that acknowledges receipt of each transition in the input data stream; and
at least one set of output wires comprising a first output wire for indicating start and end of an output packet utilizing two-phase signaling, a second and a third output wires for transmitting the output packet utilizing return to zero, dual-rail encoding, wherein signals conveyed by the first, second and third output wires comprise an output data stream, and an incoming acknowledgement wire for receiving a second acknowledgement signal that acknowledges receipt of each transition in the output data stream.

* * * * *